Feb. 7, 1950 S. BOUSKY 2,496,575
BOLOMETER TYPE TELEMETRIC SYSTEM
Filed Nov. 25, 1944 3 Sheets-Sheet 1

INVENTOR.
SAMUEL BOUSKY
BY
*Frank A. Harmon*
ATTORNEY

Feb. 7, 1950   S. BOUSKY   2,496,575
BOLOMETER TYPE TELEMETRIC SYSTEM
Filed Nov. 25, 1944   3 Sheets-Sheet 2

INVENTOR.
SAMUEL BOUSKY
BY
ATTORNEY

Feb. 7, 1950          S. BOUSKY          2,496,575
BOLOMETER TYPE TELEMETRIC SYSTEM
Filed Nov. 25, 1944          3 Sheets-Sheet 3
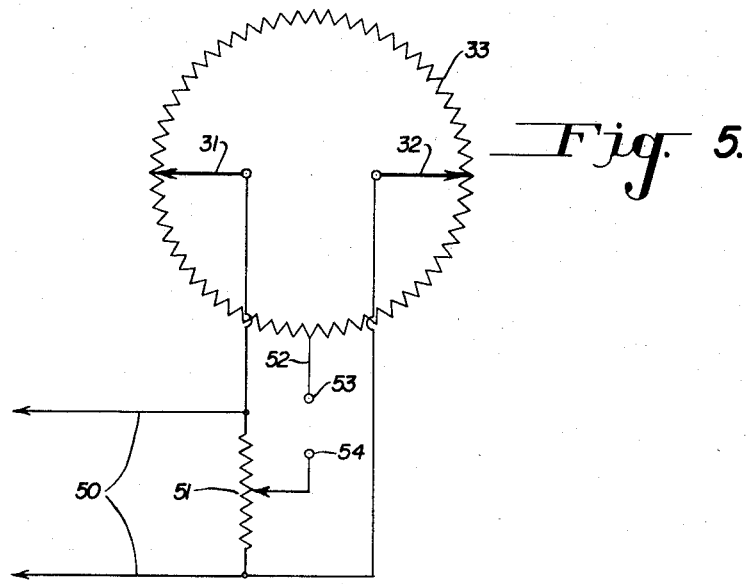
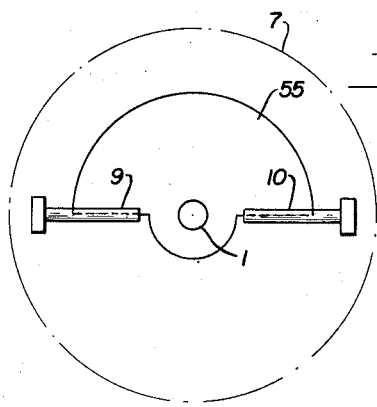
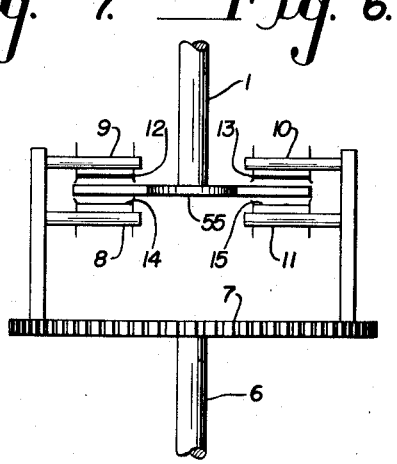
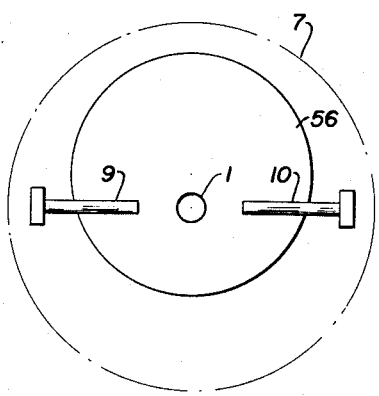
INVENTOR.
SAMUEL BOUSKY
BY
Frank H. Harmon
ATTORNEY Patented Feb. 7, 1950

2,496,575

UNITED STATES PATENT OFFICE 2,496,575

BOLOMETER TYPE TELEMETRIC SYSTEM

Samuel Bousky, Shaker Heights, Ohio, assignor, by mesne assignments, to Jack & Heintz Precision Industries, Inc., Cleveland, Ohio, a corporation of Delaware Application November 25, 1944, Serial No. 565,153

2 Claims. (Cl. 318—31)

1

This invention relates to a bolometer type telemetric system for operating self-balancing indicating or servo mechanisms without imposing a load upon the primary motive element.

The object of the invention, in general, is to provide a system of the type described for response to position and changes in position of a movable element to give a remote indication of such position, or to exert a control function in response to such position or change of position.

More specifically, the object of the invention is to provide a system of the type described in which a pair of bolometric elements having fast response receive heat from individual heater filaments under the control of a movable shroud operable by the element whose position is to be indicated, and wherein means may be provided for moving the heating and bolometric elements to follow movements of the shroud to keep the system balanced.

Figure 1:
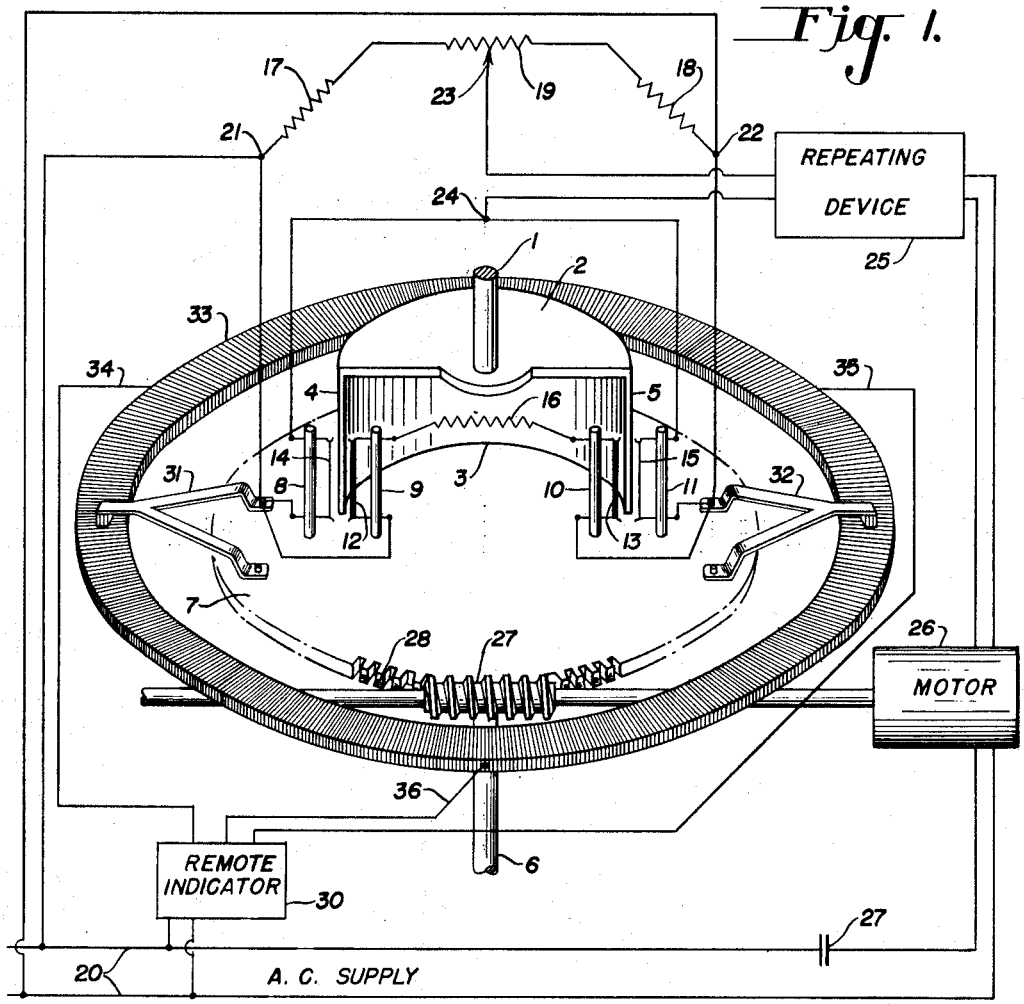
Figure 2:
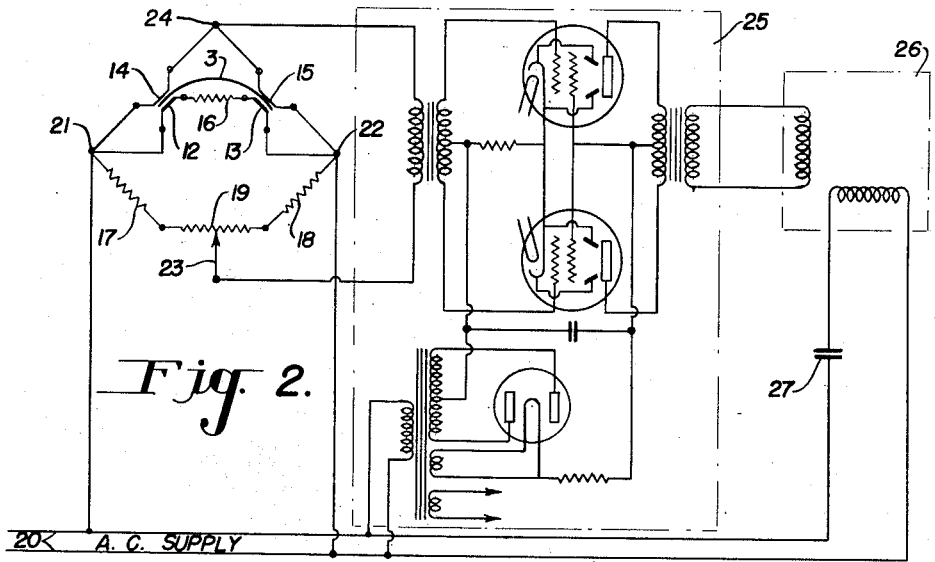

The invention is illustrated in the accompanying drawings in which:

Figure 1 illustrates a schematic arrangement of a preferred form of the present system, Figure 2 is a wiring diagram of the system shown in Figure 1.

Figure 9:
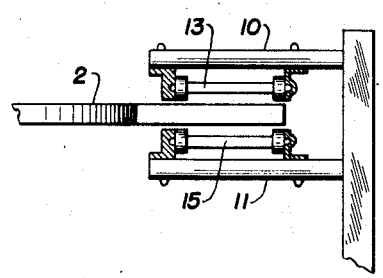
Figure 3:
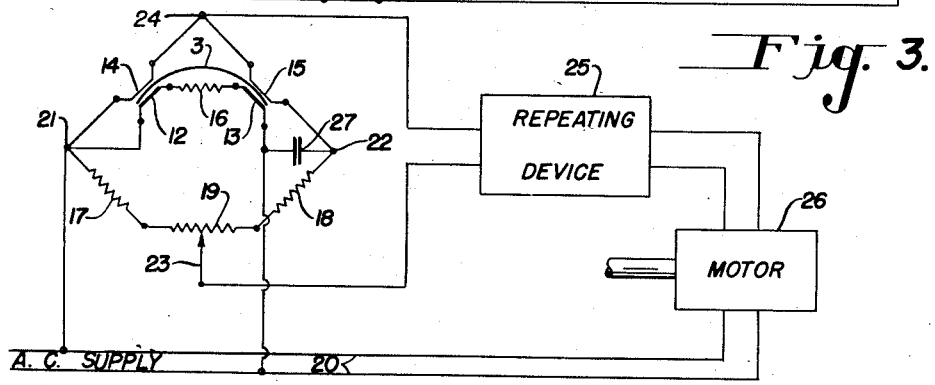
Figure 4:
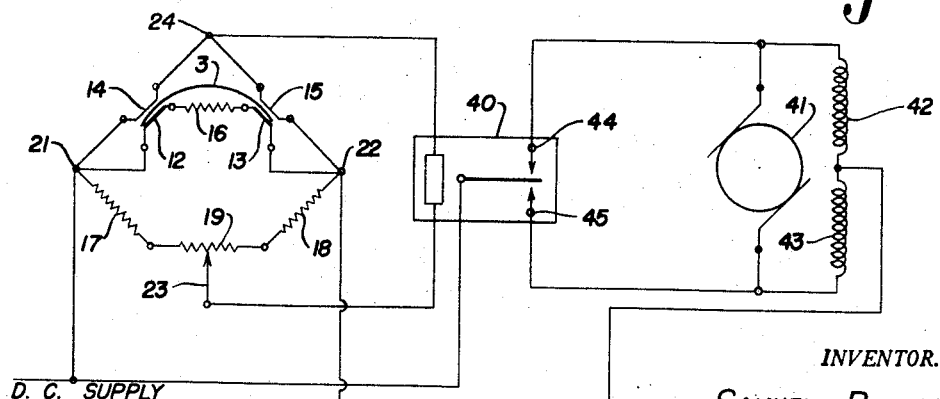

Figure 3 illustrates a modification of the system shown in Figures 1 and 2 wherein the phasing condenser is connected in series with the power supply to the bridge, Figure 4 illustrates another variation in which the system is operated from a D. C. power supply, Figure 5 shows an arrangement for producing a signal proportional to the angular displacement of a rotatable member, Figure 6 is an elevational view of a modification wherein the heater and bolometer elements are mounted for use with a disc type shroud, Figure 7 is a plan view of the modification shown in Figure 6, Figure 8 is a plan view of another modification employing a cam shaped disc shroud, and Figure 9 is an enlarged fragmentary elevational view showing a preferred mounting means for the heater and bolometer elements shown in Figure 6.

Referring first to Figure 1, the numeral 1 indicates the shaft of a movable element whose position is desired to be shown on a remote indicator, or whose movements may be desired to produce control effects through a servo mechanism, without imposing a load on the primary motive element. Thus the shaft 1 may constitute the direction indicating element of a magnetic compass or a gyro device, or the like, which is incapable of developing sufficient torque to directly operate conventional indicating or controlling mechanisms. The shaft 1 carries a shroud 2 having a depending cylindrical wall portion 3 with edge portions 4 and 5 arranged on a diametral plane through the cylindrical surface. Beneath the shaft 1 and in axial alignment therewith is a second shaft 6 carrying a disc-like follower table 7 supporting upstanding posts 8 to 11. The posts 9 and 10 carry heating elements 12 and 13 so positioned within the shroud that they are disposed in the plane of the shroud edges 4 and 5 in the manner illustrated. The posts 8 and 11 support bolometric elements 14 and 15 in the same plane on the outside of the shroud.

In the present embodiment the bolometer elements 14 and 15 are extremely thin metallic ribbons .0001" thick by .005" wide and may be made of nickel or any other conductive material which exhibits an appreciable temperature coefficient of resistivity. These ribbons are supported so that their wide surfaces squarely face the heater elements, and the radiation receiving surfaces may be coated with antimony black or some similar material to enhance the absorption of heat energy emitted by the heaters. The heater elements and the respective bolometer elements are finely adjusted so that the shroud edges 4 and 5 may interrupt substantially one-half the flow of heat energy between each pair of heaters and receivers. When this relationship exists, the follower 7 is said to be in a balanced position, and means will now be described for automatically re-balancing the follower during each movement of the primary motive element 1.

The bolometer receiver elements 14 and 15 are arranged in a bridge circuit including resistors 17, 18, 19, the latter providing a means of balancing the bridge circuit electrically. A resistor 16 serves as a current limiting resistor for the heaters. An A. C. supply 20 provides a source of voltage for the bridge across terminals 21 and 22. The other terminals 23 and 24 of the bridge are connected to some type of amplifying, relaying, or repeating device 25 the output of which provides an operating voltage for a motor 26. The motor 26 is in the present instance a two-phase A. C. motor obtaining its other voltage directly from the power source through a condenser 27. When the follower 7 is in its balanced position, as shown, the receivers 14 and 15 are heated substantially equally, and with the proper adjustment of resistor 19 no voltage appears across terminals 23 and 24, and the motor 26 is at rest.

A rotation of shaft 1 will shift the shroud 3 to permit an increase in the amount of heat energy falling on one receiver element while simultaneously reducing the heat energy falling on the other receiver element. One receiver element will thereby experience an increase in temperature which will produce an increase in its electrical resistance while the other will simultaneously experience a reduction in temperature which will produce a reduction in its electrical resistance. These electrical changes will unbalance the bridge circuit and produce an unbalanced voltage at terminals 23 and 24 causing the repeating device 25 to supply power to motor 26. The motor 26 through the worm 27 will rotate the follower plate 7, the latter being provided with worm gear teeth 28 entirely therearound. The constants of the system and the electrical voltage polarities are so chosen that the rotation of plate 7 will be in the same direction as the original rotation of shaft 1 so that the motor will endeavor to drive the plate 7 so as to follow the shroud 3 to continually rebalance the bridge circuit.

Rotation of the shaft 1 in the opposite direction would change the resistance of the receivers in the opposite order so as to unbalance the bridge in the opposite direction causing reversal of the polarity across the terminals 23 and 24 to rotate the motor in the opposite direction. Thus the plate 7 with its heaters and receivers would again follow the rotation of the shroud to automatically rebalance the bridge circuit. Because of the extreme thinness of the receiver elements 14 and 15 their temperatures respond with extreme speed to small changes in received heat energy, and the accompanying change in electrical resistance produces a rapid servo or self-balancing system. In a preferred embodiment constructed according to Figure 1 the time for response of the plate 1 in following a movement of the shroud 3 is estimated to be approximately $\frac{1}{10}$ of a second which is sufficiently fast for the present purpose. The bolometer receiver elements 14 and 15 may be designed for quicker response and they may also obviously be designed for slower response if such is desired. The alternating current source 20 may be of any frequency, 400 cycles being at present preferred.

That portion of the system of Figure 1 just described constitutes a self-balancing servo system which may be employed to exert an indicating or control function through the shaft 6 as the latter follows the movements of the primary motive element 1. Means will now be described in the system of Figure 1 for controlling a remote indicator 30 to produce an indication or servo function duplicating the movements of shaft 6 at one or more remote stations. For this purpose the plate 7 is provided with a pair of contact fingers 31 and 32 arranged on diametrically opposite sides of the shaft 6 for contact with a continuously wound coil or contact ring 33. The ring 33 is tapped by three leads 34, 35, 36, spaced 120° apart for energizing the indicator 30. If an A. C. power supply is employed the ring 33 may be wound either with a resistance wire on an insulating core or with more conductive wire on a magnetic core, the indicator 30 being of a self-synchronizing type well known in the art.

By making certain changes in the elements 25, 26 and 30 the entire system could be arranged to operate on a D. C. source of power. If a D. C. power source is used the ring 33 could be of the resistance wire type and the remote indicator 30 of the polarized or permanent magnet type well known in the art.

Thus it is seen that the present system provides a means for either remotely indicating or recording the position of the shaft 6, or for producing a remote servo function of some other nature. It is understood that if the remote indication or control is not desired, the local indication or control may be produced directly by the shaft 6 or the motor shaft, thereby eliminating the ring 33, contact fingers 31 and 32 and the remote indicator 30. The present system either with or without the remote indicator is very rapid in its response and possesses the advantage of imposing no load on the primary motive element. The shaft 1 and shroud 3 may be coupled, as previously described, to a magnetic compass needle, a gyro gimbal or any other indicating device or mechanism from which power cannot be drawn without affecting its accuracy.

The schematic arrangement shown in Figure 1 does not illustrate means for electrically connecting the stationary terminal points 21, 22 and 24 with the plate 7 which must be free to rotate. In practice these connections are made through concentric collector rings and wiper connectors on the under side of plate 7 in a manner well understood in the art.

Figure 2 is a wiring diagram of the balancing system shown in Figure 1 without reference to the remote indicator 30 and its associated contact ring 33 and contact fingers 31 and 32. The repeating device 25 comprises an electronic amplifier supplying power directly to motor 26 which is illustrated to be a two-phase motor. Quadrature voltage for the motor is obtained from the A. C. power supply 20 directly through the phasing condenser 27 in the manner previously described. The amplifier 25 is of conventional form, a detailed description of which is unnecessary to the understanding of the present system.

Figure 3 illustrates a modified arrangement for obtaining a quadrature voltage for motor 26 wherein the condenser 27 is connected in series with the power supply to the bridge. In other respects the system of Figure 3 corresponds to the system shown in Figures 1 and 2.

Figure 4 illustrates a variation of the system for operation by D. C. power supply. In this case the repeating device takes the form of a sensitive D. C. relay 40 with a permanent magnet polarized field and the motor is a D. C. motor with a split field winding as shown. The armature 41 and the two fields 42 and 43 are energized in accordance with the operation of the relay 40 in response to the direction of unbalance of the bridge circuit to produce motor operation in opposite directions. It will be seen that the single pole double throw switch action of the relay merely reverses the current in the armature to produce reverse rotation of the motor while the current in the two fields remains always in the same direction. A permanent field magnet motor could also be used with a slightly different contact arrangement on the relay 40.

With further reference to Figure 4, a current limiting resistance may be inserted in the motor circuit if desired, but in any event each field coil is designed to safely operate one half the time on the voltage impressed across the motor, which is the maximum possible operating time in one direction under ordinary conditions. In practice, the rebalancing of the system after each slight relative movement of the shroud is so rapid that the motor operates only momentarily, and then remains stationary until another signal is received. The armature conductor has sufficient turns to develop the necessary torque in series with one of the field coils, the other field coil drawing a current large in proportion to the armature current to produce a high field strength. The intervals of motor operation are so brief, and the amounts of power involved are so small, that motor losses assume a secondary importance to simplicity and reliability of the system.

With further reference to Figure 4, it will be understood that while the bridge as shown operates on D. C. to actuate a D. C. relay, the entire system may be excited from an A. C. source instead of a D. C. source while still using a D. C. relay. This constitutes Figure 4 a modification of Figure 2 in that the entire system would be replaced by a single D. C. relay requiring only that the D. C. be applied to the bridge terminals 21 and 22 and be obtained from a simple dry disc rectifier connected to the line terminals 20.

Another variation of Figure 4 operating from an A. C. supply may be obtained by exciting the bridge as shown but replacing the relay 40 with a similar relay having an A. C. field excited from the same power supply instead of a permanent magnet field. In such an arrangement the motor 41 would again be a two-phase motor.

A modification such as shown in Figure 5 may be employed where it is desired that the magnitude of the signal at the contact fingers 31 and 32 should be proportional to the angular rotation of the shaft. This is accomplished by the addition of the impedance 51 connected across the power supply 50 as shown. As the shroud changes position the plate 7 changes position accordingly, carrying with it contact fingers 31 and 32. If the tap 52 is connected at 90° from the normal positions of the wiper contacts the terminals 53 and 54 will supply a voltage whose magnitude is proportional to the angular rotation of the wiper contacts and whose polarity will indicate the direction of rotation.

Figure 6 is a side elevational view illustrating the use of a disc type shroud 55 in place of a cylindrical shroud, and Figure 7 is a plan view of the same. The action is of the on and off type and operates the same as the arrangement shown in Figure 1. Where it is desired that the magnitude of the signal in the terminals 23 and 24 should vary with the angular rotation of the shroud the arrangement of Figure 8 may be used wherein the shroud 56 takes the form of an accentric disc. The disc 56 is arranged so that when the system is in its normal or balanced position one-half the length of each heater-receiver combination is intercepted, the heater and receivers being positioned as shown in Figure 6 so that upon movement of the shroud one receiver will be covered as the other is uncovered. The disc 56 is in the nature of a cam and may be given any cam shape desired.

Figure 9 illustrates a mounting arrangement for heater and receiver elements contained in sealed tubes which may be evacuated, the numeral 2 designating a shroud of any of the previously mentioned types. The heater and receiver elements 13 and 15 are held in clips on the posts 10 and 11 in the proper relative positions, so as to be readily removable and replaceable.

Other variations and modifications of the present system may be had. For instance, it need not be limited to the indication of rotary motion alone. It can be used equally well for obtaining a signal either for indication or control purposes responsive to translatory motion. Also, the arrangement of mounting the heater and receiver elements may be varied considerably within the scope of the invention. The heater elements may be either single filaments, coiled filaments, electric elements or heater units of any other type which will produce the desired heat transfer.

The receivers need not necessarily be blackened as described. They may be mounted in evacuated tubes and may be multi-element providing that the bolometric principle is maintained. Resistors 17 and 18 in the bridge may be changed to additional bolometric elements wherein 14 and 18 are mounted very close together opposite the heater element 12, and 15 and 17 are mounted close together opposite the heater element 13. Such an arrangement would afford much greater bridge sensitivity. The repeating device 25 shown as an electronic amplifier may be alternatively a thyratron type control, a saturable reactor type amplifier, or one of several types of relays. All such modifications are included in the invention, the same being limited only by the scope of the appended claims.

I claim:

1. A telemetric system comprising a primary indicating shaft, a shroud carried thereby, a follower rotatably mounted independently of said shaft for correlative movement therewith, heating elements and bolometer receiving elements carried by said follower, said heating and receiving elements being arranged on opposite sides of said shroud so that the latter controls the heat received by the heating elements, a bridge circuit including said receiving elements, a single phase A. C. supply for said bridge circuit, and a two-phase motor receiving one phase from said supply through a phasing condenser and receiving the other phase from the output of said bridge for rotating said follower to produce said correlative movement in response to the heat received by said receiving elements.

2. A telemetric system comprising a primary indicating shaft, a shroud carried thereby, a follower rotatably mounted independently of said shaft for correlative movement therewith, heating elements and bolometer receiving elements carried by said follower, said heating and receiving elements being arranged on opposite sides of said shroud so that the latter controls the heat received by the heating elements, and means responsive to said received heat to produce said correlative movement of said follower, said heating and receiving elements being removably mounted in spring clips arranged to hold said elements in their proper positions relative to each other and to said shroud.

SAMUEL BOUSKY.

REFERENCES CITED

The following references are of record in the file of this patent:

UNITED STATES PATENTS

| Number | Name | Date |
| --- | --- | --- |
| 1,419,010 | Brown | June 6, 1922 |
| 1,545,433 | Lee | July 7, 1925 |
| 1,573,850 | Naiman | Feb. 23, 1926 |
| 1,585,210 | Roux | May 18, 1926 |
| 1,916,737 | Midworth | July 4, 1933 |
| 1,944,721 | Sell | Jan. 23, 1934 |
| 2,172,961 | Merr | Sept. 12, 1939 |
| 2,221,144 | Langasser | Nov. 12, 1940 |
| 2,273,596 | Rylsky | Feb. 17, 1942 |
| 2,357,205 | Keeler | Aug. 29, 1944 |

FOREIGN PATENTS

| Number | Country | Date |
| --- | --- | --- |
| 16,979 | Great Britain | of 1902 |
| 243,048 | Great Britain | Nov. 16, 1925 |
| 835,856 | France | Jan. 5, 1939 |
| 330,154 | Italy | Oct. 5, 1935 |